United States Patent
Lang et al.

(10) Patent No.: US 7,879,453 B2
(45) Date of Patent: Feb. 1, 2011

(54) ALLOY, IN PARTICULAR FOR A BEARING COATING

(75) Inventors: Hubert Lang, Au an der Donau (AT); Thomas Rumpf, Gmunden (AT)

(73) Assignee: Miba Gleitlager GmbH, Laakirchen (AT)

( * ) Notice: Subject to any disclaimer, the term of this patent is extended or adjusted under 35 U.S.C. 154(b) by 1186 days.

(21) Appl. No.: 10/575,088

(22) PCT Filed: Oct. 5, 2004

(86) PCT No.: PCT/AT2004/000338
§ 371 (c)(1), (2), (4) Date: May 24, 2006

(87) PCT Pub. No.: WO2005/033353
PCT Pub. Date: Apr. 14, 2005

(65) Prior Publication Data
US 2007/0042218 A1    Feb. 22, 2007

(30) Foreign Application Priority Data
Oct. 8, 2003    (AT) .............................. A 1589/2003

(51) Int. Cl.
B32B 5/02 (2006.01)
B32B 15/01 (2006.01)
B32B 15/04 (2006.01)
B32B 15/20 (2006.01)
B32B 15/18 (2006.01)
F16C 32/00 (2006.01)

(52) U.S. Cl. ................. 428/615; 428/640; 428/646; 428/650; 428/655; 428/674; 384/445

(58) Field of Classification Search ................. None
See application file for complete search history.

(56) References Cited

U.S. PATENT DOCUMENTS

| 3,863,318 A | 2/1975 | Niimi et al. |
| 3,941,903 A | 3/1976 | Tucker |
| 4,904,362 A | 2/1990 | Gaertner et al. |
| 5,045,405 A | 9/1991 | Koroschetz et al. |

(Continued)

FOREIGN PATENT DOCUMENTS

DE    23 11 091 A    9/1973

(Continued)

OTHER PUBLICATIONS

German Office Action dated Jun. 26, 2006 with English translation of relevant parts.

*Primary Examiner*—Jennifer C McNeil
*Assistant Examiner*—Jason L Savage
(74) *Attorney, Agent, or Firm*—Collard & Roe, P.C.

(57) ABSTRACT

The invention relates to an alloy, in particular for an antifriction coating, comprising elements which form a matrix (2) and at least a soft phase (3) and/or a hard phase (5), which soft phase elements and/or hard phase elements form a solid solution or a bond with the matrix element. The soft phase (3) and/or hard phase (5) is dispersed in the matrix (2) and the solid solution or bond is formed only in the region of the phase boundary (4) of the matrix (2) with the soft phase (3) and/or with the hard phase (5).

11 Claims, 2 Drawing Sheets

U.S. PATENT DOCUMENTS

| | | |
|---|---|---|
| 5,104,444 A | 4/1992 | Shioda et al. |
| 5,302,414 A | 4/1994 | Alkhimov et al. |
| 5,525,203 A * | 6/1996 | Rumpf et al. ............... 205/122 |
| 6,017,591 A * | 1/2000 | Popoola et al. ............. 427/449 |
| 6,022,629 A * | 2/2000 | Rumpf et al. ............... 428/553 |
| 6,066,191 A * | 5/2000 | Tanaka et al. ................. 75/246 |
| 6,139,191 A | 10/2000 | Andler et al. |
| 6,146,019 A | 11/2000 | Andler et al. |
| 6,203,895 B1 * | 3/2001 | Berger et al. ................ 428/325 |
| 6,235,405 B1 | 5/2001 | Rumpf |
| 6,254,701 B1 | 7/2001 | Oshiro et al. |
| 6,309,759 B1 | 10/2001 | Tomikawa et al. |
| 6,444,259 B1 * | 9/2002 | Subramanian et al. ...... 427/191 |
| 6,491,208 B2 * | 12/2002 | James et al. ................ 228/119 |
| 6,506,503 B1 | 1/2003 | Mergen et al. |
| 6,596,412 B2 | 7/2003 | Mergen |
| 2002/0031684 A1 | 3/2002 | Neigel |
| 2002/0182331 A1 * | 12/2002 | Oldiges et al. .............. 427/404 |
| 2003/0123763 A1 | 7/2003 | Takahashi |
| 2004/0110021 A1 * | 6/2004 | Seth et al. ................... 428/553 |
| 2004/0177902 A1 | 9/2004 | Mergen et al. |
| 2004/0202887 A1 | 10/2004 | Kawachi et al. |
| 2005/0003225 A1 | 1/2005 | Gartner |
| 2005/0069724 A1 * | 3/2005 | Obara ......................... 428/544 |
| 2005/0220995 A1 * | 10/2005 | Hu et al. ..................... 427/180 |
| 2006/0022411 A1 * | 2/2006 | Beardsley et al. ........... 277/345 |
| 2006/0093736 A1 * | 5/2006 | Raybould et al. ........... 427/180 |
| 2007/0042218 A1 | 2/2007 | Lang et al. |
| 2007/0065067 A1 | 3/2007 | Gartner et al. |
| 2007/0151639 A1 | 7/2007 | Oruganti et al. |
| 2009/0003740 A1 | 1/2009 | Schubert et al. |

FOREIGN PATENT DOCUMENTS

| | | |
|---|---|---|
| DE | 23 56 616 A | 5/1974 |
| DE | 39 06 402 A1 | 9/1990 |
| DE | 689 18 900 | 2/1995 |
| DE | 197 28 777 | 4/1999 |
| DE | 198 24 310 | 8/1999 |
| DE | 198 09 721 A1 | 9/1999 |
| DE | 198 24 308 | 9/1999 |
| DE | 100 09 868 | 9/2000 |
| DE | 100 32 624 | 4/2001 |
| DE | 10 2004 015 827 | 11/2004 |
| EP | 0 300 993 | 1/1989 |
| EP | 0 300 995 | 1/1989 |
| EP | 0 484 533 | 5/1992 |
| EP | 0 484 533 A | 5/1992 |
| EP | 0 273 332 A1 | 7/1998 |
| EP | 0 911 425 A | 4/1999 |
| EP | 0 940 478 A | 9/1999 |
| GB | 2 355 016 | 4/2001 |
| GB | 2 359 563 | 8/2001 |
| JP | 04-028836 | 1/1992 |
| JP | 11-257355 | 9/1999 |
| JP | 2000-017363 | 1/2000 |
| JP | 2000-017363 A | 1/2000 |
| WO | WO 97/22725 A1 | 6/1997 |
| WO | WO 01/00331 A | 1/2001 |
| WO | 2005/033353 | 4/2005 |
| WO | 2005/080620 | 9/2005 |

* cited by examiner

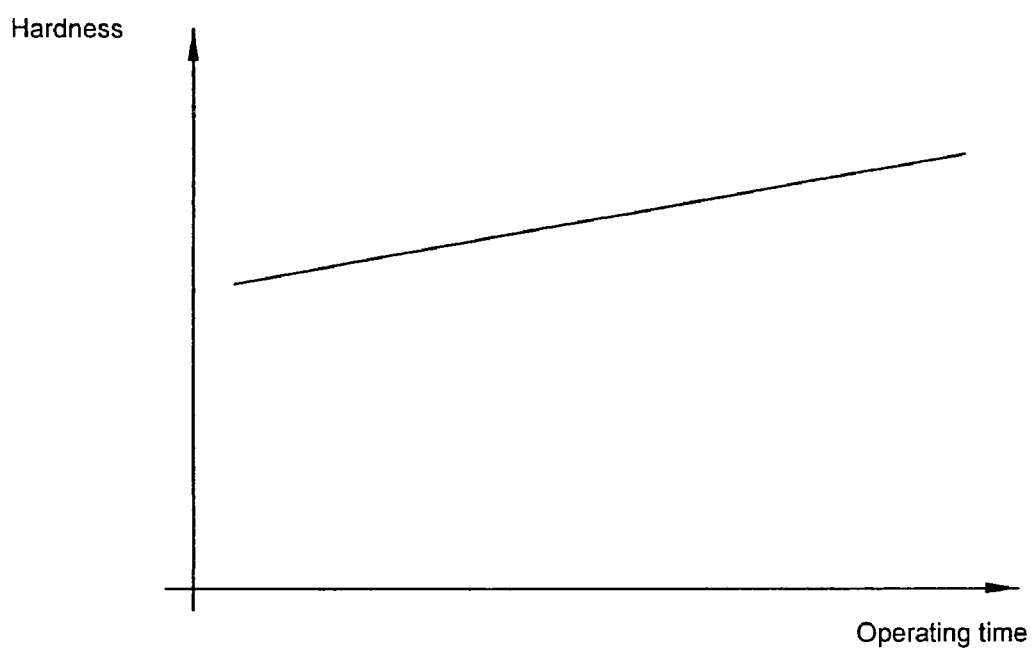

ALLOY, IN PARTICULAR FOR A BEARING COATING

CROSS REFERENCE TO RELATED APPLICATIONS

Applicants claim priority under 35 U.S.C. §119 of Austrian Application No. AT 1589/2003 filed Oct. 8, 2003. Applicants also claim priority under 35 U.S.C. §365 of PCT/AT2004/000338 filed Oct. 5, 2004. The international application under PCT article 21(2) was not published in English.

The invention relates to an alloy, in particular for an anti-friction coating, comprising elements which form a matrix and at least a soft phase and/or a hard phase, which soft phase elements and/or hard phase elements produce a solid solution or bond with the matrix element, an anti-friction coating, in particular a bearing anti-friction coating made from the alloy, a composite material comprising at least a first peripheral coating and a second peripheral coating disposed opposite it, for example a protective coating of steel, in particular for anti-friction bearings or thrust washers, a method of producing the composite material and the use of the alloy to produce an anti-friction coating for an anti-friction bearing or a thrust washer or for directly coating components subjected to friction stress.

Technical progress made in the engine construction industry has meant that increasingly tough requirements are being placed on many aspects of anti-friction elements, such as plain bearings or thrust washers or sliding bushes for example. The anti-friction element or its anti-friction coating should be soft enough to enable it to adapt well to faults of the cooperating anti-friction element caused by production on the one hand, but the anti-friction coating should be sufficiently hard or have a high enough strength to exhibit good durability or bearing capacity during operation at high speeds and when subjected to vibrations or high mechanical stress, on the other hand. The properties which can be achieved in these anti-friction coatings and bearings always mean having to strike a compromise. If the emphasis is on good running-in or resistance to galling, the anti-friction coating itself is usually only able to withstand low mechanical stress because the forces to which the shaft or the bearing is exposed are transmitted as a whole and exclusively by the soft anti-friction coating which is therefore susceptible to wear at an early stage. If, on the other hand, elements are provided which are capable of withstanding such abrasion, they are so at the expensive of reduced ability of the coating to adapt.

In the case of standard coatings made by hot metal processing techniques, such as disclosed in patent specifications WO 97/22725 A or DE 39 06 402 C2, an attempt is made to combine these intrinsically contradictory property profiles by alloying an element which forms the matrix of the material, elements which form the soft phases, such as lead, tin, zinc or bismuth, for example, so that the coating is able to adapt and embed pieces abraded from the parts to be supported, e.g. shafts. In order to increase the strength and bearing capacity, other elements are incorporated in the alloy which form a hard phase, for example inter-metallic compounds or mixed crystals. Depending on the content of the different elements, the emphasis will therefore be on good ability to embed or good resistance to galling or high bearing capacity.

Also quite common are anti-friction elements made from copper-based materials, for example, which as a rule have a high grinding resistance due to elements forming soft phases, such as lead. Due to the fact that it does not mix or as a result of the gaps which occur when copper and lead are mixed, the lead separates and disperses in the copper matrix and is responsible for the good tribological properties of this material.

Thermally sprayed coatings for runner blades are known from patent specification DE 198 09 721 A1, and the coating has a higher degree of hardness than the underlying metal base in order to increase resistance to abrasion. Amongst the coating materials mentioned are alloys with a base of Ni, Co, Fe, cermets or hard metals.

Patent specification EP 0 911 425 A1 describes a method of spraying cold gas as a means of coating substrate materials. Amongst others, nitrogen, argon, neon, xenon or carbon dioxide are mentioned as a process gas. Overall, the intention is to improve the quality of the coating on the basis of an appropriate temperature, pressure and particle velocity.

The objective of the invention is to propose an alloy and an anti-friction coating for an anti-friction element, which, in addition to exhibiting good run-in properties, also has a high resistance to wear.

This objective is achieved by the invention, in each case independently, by means of an alloy of the type described above, in which the soft phase and/or the hard phase is dispersed in the matrix and the solid solution or bond is formed only in the region of the phase boundary of the matrix with the soft phase and/or with the hard phase, an anti-friction coating formed therefrom, a composite material comprising a first peripheral coating made from the anti-friction coating proposed by the invention as well as a method, whereby, using a cold gas spraying process, an alloy as proposed by the invention can be produced as a first peripheral coating. The advantage of this approach is that it is now possible to produce an alloy and an anti-friction coating for anti-friction elements which can not be produced using the molten metal processes known from the prior art or with other thermal spraying processes. The fact that the particles of the initial powder are not melted advantageously enables anti-friction coatings containing alloy elements to be produced, which can not be combined using standard production or melting methods to obtain the desired properties, such as high resistance to wear or high bearing capacity and good run-in properties, because the elements are not present as a soft phase but in the form of mixed crystals or compounds. The alloy or the combination of alloy elements which form a stable phase or phase mixtures in the form of mixed crystals or inter-metallic compounds based on the corresponding phase diagram for a selected composition using metallurgical techniques based on melting, in other words which do not separate, can be produced by the present invention in the form of a virtually separating alloy system. The advantage of the alloy proposed by the invention is that the solid solution or bond occurs only in the region of the phase boundaries as a result of which both soft phases and hard phases are essentially dispersed in the matrix. This means that elements can also be used as soft phases and can therefore be employed as a means of imparting galling resistance properties to the bearing, which, if produced by casting or sintering or similar methods, would be present in the matrix as mixed crystals and would thus tend to increase strength instead of being available as soft phases. Likewise, the hard particles or hard phases may be dispersed in the material in their original composition, the particular advantage of which is that they can increase the wear resistance of the coating and will not react with the matrix or other elements as is the case with conventionally produced bearings, for example due to the formation of inter-metallic phases. Another advantage is that during operation, the coating undergoes a sort of heat treatment in areas where the anti-friction coating is particularly subjected to loads due to the increases in temperature which occur locally, as a result of which a slow phase transformation takes place in these areas and the alloy moves close to thermodynamic equilibrium. The material hardens in these areas. As a result, the anti-friction coating is harder in these areas subjected to high loads and is therefore more durable in areas that are not subjected to such high thermal stress but remains soft enough and retains its embedding capacity to fulfil tribological requirements. The anti-friction coating automatically adapts in a certain way to the respective load state. Overall, this enables both the galling resistance properties as well as the bearing capacity and wear resistance to be improved. Furthermore, the advantage of producing the alloy using a cold gas spraying process is that the substrate material is subjected to only slight stress due to temperature, which means that even temperature-sensitive substrates can be spray-coated with the alloy proposed by the invention or the anti-friction coating, without the substrate undergoing any change, for example in terms of mechanical properties. In addition, compared with other thermal spraying processes, thick coatings with a high coating quality can be produced, thereby enabling the best thickness coating to be selected for the individual application. As a result of the low temperatures, the resulting coatings are low in oxides, which has a positive effect on many of the properties of the coating. Furthermore, the alloy or the coatings can be produced easily and inexpensively due to simple processing and high coating efficiency.

In one embodiment, the mean particle size of the dispersed soft phase and/or hard phase is 1 μm to 100 μm, preferably 5 μm to 20 μm, which ensures an optimal mean particle size of the dispersed phases for the respective application and hence both a sufficient minimum size to guarantee effectiveness and a maximum size which does not impair mechanical strength.

Due to the fact that the range of the phase boundary in which the solid solution or bond is formed has an average thickness in the range of between 0.1 μm and 3 μm, preferably between 0.5 μm and 2.5 μm, a sufficiently large grain is present in the alloy but has not yet formed a solid solution or bond with the matrix, which ensures that soft phases will still guarantee good galling resistance properties and hard phases will retain a high wear resistance.

The matrix element is selected from an element group comprising aluminium, chromium, copper, magnesium, manganese, molybdenum, nickel, silicon, tin, titanium, tungsten and zinc, and the soft phase element is different form the matrix element, the advantage of which is that properties of the alloy, such as temperature resistance and basic strength, can be specifically adapted to the respective intended use and application, in addition to which the pricing of the bearing can be influenced to a certain degree.

In another embodiment, the proportion of matrix element is at least 55% by weight, in particular at least 65% by weight, the advantage of which is that the anti-friction coating has a high mechanical strength and the soft phases and/or hard phases can be optimally embedded in the matrix.

The soft phase may be at least one element selected from an element group comprising silver, aluminium, gold, bismuth, carbon (graphite), calcium, copper, indium, magnesium, lead, palladium, platinum, scandium, tin, yttrium, zinc and lanthanoids, and the soft phase element is different from the matrix element. This enables the tribological properties of the alloy or anti-friction coating to be optimally adapted to the specific application due to the different properties, in particular the different degrees of hardness, of the different soft phases and an optimal selection for an intended application can be made with respect to temperature resistance, in particular coefficients of diffusion and the tendency to diffuse in conjunction with the matrix element.

In one embodiment, the soft phase is selected from a group comprising $MoS_2$, PTFE, Silicone, barium sulphate, and mixtures thereof, the advantage of which is that the bearing element can also be used entirely without or with only the smallest quantities of lubricant, e.g. grease or oil.

In another embodiment, the proportion of soft phase is in the range of between 10% by weight and 45% by weight, in particular between 15% by weight and 35% by weight, the advantage of which is that the embedding capacity and galling resistance properties of the bearing can be adjusted to suit the respective application.

It is also of advantage if the hard phase is formed by at least one element selected from an element group comprising boron, carbon (diamond), cobalt, hafnium, iridium, molybdenum, niobium, osmium, rhenium, rhodium, ruthenium, silicon, tantalum, tungsten and zirconium, and the hard phase element is different from the matrix element, because the properties of the alloy in terms of strength and its wear resistance and temperature resistance can be selected within a broad range specifically to suit the intended application.

In another variant, the hard phase is selected from a group comprising $ZnS_2$, BN, $WS_2$, carbides, such as for example SiC, WC, $B_4C$, oxides, such as for example MgO, $TiO_2$, $ZrO_2$, $Al_2O_3$, and mixtures thereof, the advantage of which is that high particle hardness levels and hence a very high wear resistance can be obtained.

In another embodiment, the proportion of hard phase is in the range of between 3% by weight and 25% by weight, in particular between 5% by weight and 20% by weight, thereby enabling wear resistance to be optimised.

In one embodiment of the composite material, an additional coating is formed between the first peripheral coating and the second peripheral coating and constitutes a diffusion barrier or adhesion coating, the advantage of which is that optimum adhesion or a diffusion barrier can be obtained between the two coatings even when using different substrate materials for the second peripheral coating and different matrix elements for the anti-friction coating.

In one embodiment of the method, the second peripheral coating is formed by a supporting layer, for example made from steel, and the first peripheral coating is sprayed on top of it, which increases strength and lengthens the service life of the bearing, for example, because mechanical forces acting on the bearing can be absorbed or deflected by the supporting layer.

It is also of advantage if an additional coating is provided in the form of a diffusion barrier or adhesion coating between the first peripheral coating and the second peripheral coating and is sprayed on top of the second peripheral coating, because this enables the diffusion barrier or adhesion coating to be sprayed on first of all, after which the alloy proposed by the invention is sprayed on top of it, all in a continuous operation using the same equipment, without having to manipulate the supporting layer.

The process gas may be a gas selected from a group comprising helium, argon, nitrogen and mixtures thereof, thereby enabling high spraying rates to be achieved as well as low oxidation of the initial powder.

The gas temperature may be selected from a range of between 60% and 95% of the melting temperature of the alloy element with the lowest melting temperature, the advantage of which is that a high adhesion and coating quality of the join can be achieved depending on the alloy elements used.

In one variant, the gas temperature is selected from a range of between 65% and 90%, preferably between 70% and 85%, of the melting temperature of the alloy element with the lowest melting temperature, which enables the amount of oxygen absorbed by the powder to be reduced and thus results in a coating with a lower oxide content.

In another variant, the gas temperature may be selected from a range of between 95% and 130% of the melting temperature of the alloy element with the lowest melting temperature, which enables the coating quality to be further increased by raising the particle velocity, resulting in better adhesion of the particles, and the particles are prevented from becoming totally molten due to the extremely short dwell time in the gas jet.

Due to the fact that a separate cold gas spray system is used for each alloy element used and for each phase, the spraying parameters can be optimised in the best possible way for each individual element, enabling an optimum coating quality to be obtained.

By virtue of another option, the initial powder used for spraying purposes has a particle diameter in the range of 3 μm to 70 μm, preferably 5 μm to 55 μm, as a result of which the mechanical properties of the anti-friction coating can be adapted to requirements within a broad range.

The invention further relates to the use of the alloy to produce an anti-friction coating of an anti-friction bearing or a thrust washer or for directly coating components subjected to friction.

To provide a clearer understanding, the invention will be explained in more detail with reference to the appended drawings. The schematically simplified diagrams illustrate the following:

FIG. 3 illustrates the change in hardness of the anti-friction coating in areas subjected to load during the operating time.

Figure 1:
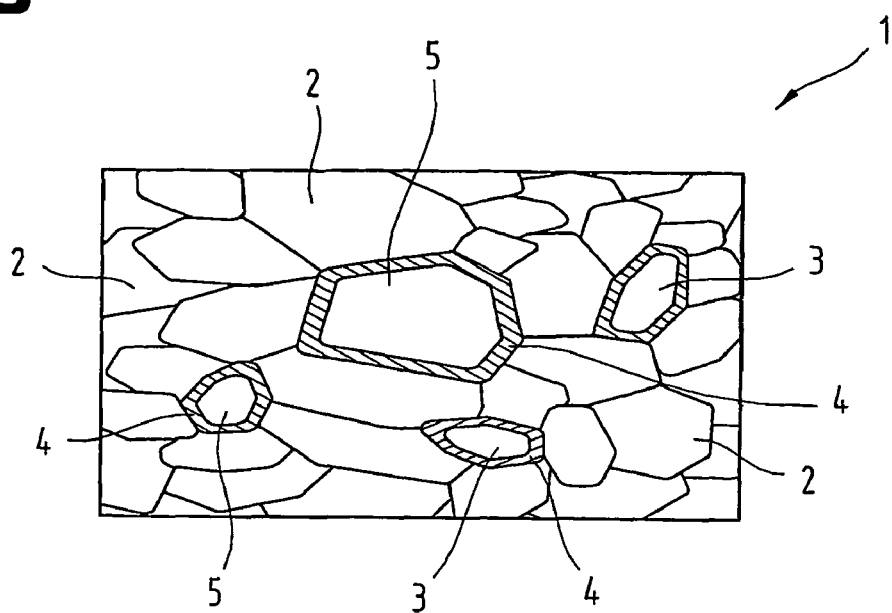
FIG. 1 is a schematic diagram showing the structure of an anti-friction coating made from the alloy proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 provides a schematic diagram illustrating the structure 1 of an anti-friction coating made from the alloy proposed by the invention.

Particles or grains of a matrix alloy element and a matrix 2 are illustrated, as well as particles or grains of a soft phase 3. The anti-friction coating or alloy produced by a cold gas spraying process consists of alloy elements, the combination of which in thermodynamic equilibrium forms a non-separating alloy system.

It should be pointed out at this stage that in FIG. 1, the shape and size of the individual grains or particles and the size ratio of the grains relative to one another are not illustrated true to scale and this is merely a schematic diagram.

A copper-tin anti-friction coating can be produced, in which, for example, the matrix 2 or a matrix element is formed by copper and the soft phase 3 or soft phase element is formed by tin, which imparts good tribological properties to the anti-friction coating.

However, the corresponding phase diagram teaches that, for an assumed composition of approximately 75% by weight of copper and 25% by weight of tin (for the sake of simplicity, other additional alloying elements which are used to improve the properties of the anti-friction coating are not addressed), the copper element will form inter-metallic phases with the tin element at these concentrations and the tin will dissolve in the α-copper phase and form mixed crystals.

The alloy or the structure schematically illustrated in FIG. 1 should therefore not exhibit a copper matrix 2 and tin soft phases 3, but rather copper-rich α-mixed crystals and inter-metallic Cu—Sn phases. This material would not be very suitable for use as anti-friction coatings due to the absence of soft phases.

Due to the fact that the alloy proposed by the invention is produced by means of a cold gas spraying process, it is now possible to produce the tin soft phases 3 which are suitable for anti-friction coatings in this non-separating alloy system. As a result, the desired tribological properties can also be achieved with the Cu, Sn combination of elements and all the advantages which these elements offer in alloys for anti-friction coatings can expediently be used, such as high availability, inexpensive raw material costs, ease of processing, good mechanical properties.

The copper-tin alloy system is but one example of a whole range of other non-separating alloy systems and the protective scope of the invention is not restricted to this particular one. The person skilled in this field will be able to devise other element combinations within the specified ranges on the basis of this teaching and these compositions also fall within the scope of the invention.

The formation of inter-metallic phases or mixed crystals between the matrix 2 and the soft phase 3 takes place within only a narrow region of a phase boundary 4 of the matrix 2 with the soft phase 3. The composition of the soft phase 3 remains in its original form. The formation of the joint in the region of the phase boundary 4 naturally takes place on the basis of a controlled diffusion.

The explanations given above with reference to FIG. 1 in respect of soft phases 3 also applies to hard phases, in which case the alloy elements which would form mixed crystals or inter-metallic compounds with other elements contained in the alloy based on the corresponding phase diagram form hard phases 5 and remain in their original composition. These elements are therefore able to unleash their full effect in improving wear resistance and this property is therefore not partially lost as it would otherwise be due to the formation of mixed crystals and is not reduced in any way.

The hard phases 5 are dispersed in the matrix 2, and the original composition is maintained in the interior of the grain and a compound is formed only in the region of the phase boundary 4 with the matrix 2 and/or with the soft phase 3.

The invention is not limited to systems based on two substances but also lends itself to systems based on three or more substances because the soft phase 3 and/or the hard phase 5 can already be formed with systems based on one or more substances.

The expression "non-separating" in this connection should be understood as meaning that the element constituting the matrix 2 forms a non-separating alloy system with the main alloy element of the soft phase 3 and/or the hard phase 5, for example in hot metallurgical processing.

With regard to adding the elements forming the soft phase, the properties of the anti-friction coating can be optimised insofar as mixtures adapted to the respective application in terms of the ductility of the elements are produced, which, in addition to the desired galling resistance properties, also have a higher mechanical strength to a certain extent.

For example, the soft phase 3 may be selected from a group comprising $MoS_2$, PTFE, silicone, barium sulphate as well as mixtures thereof, as a result of which anti-friction coatings with good anti-friction and galling resistance properties can be produced which even permit dry operation if necessary. This enables operation with a small amount of lubricant or no lubricant. Anti-friction coatings of this type are also characterised by their low maintenance requirements.

The anti-friction coating proposed by the invention may also be produced by a galvanic process and may be reinforced with particles to improve the mechanical properties.

Figure 2:
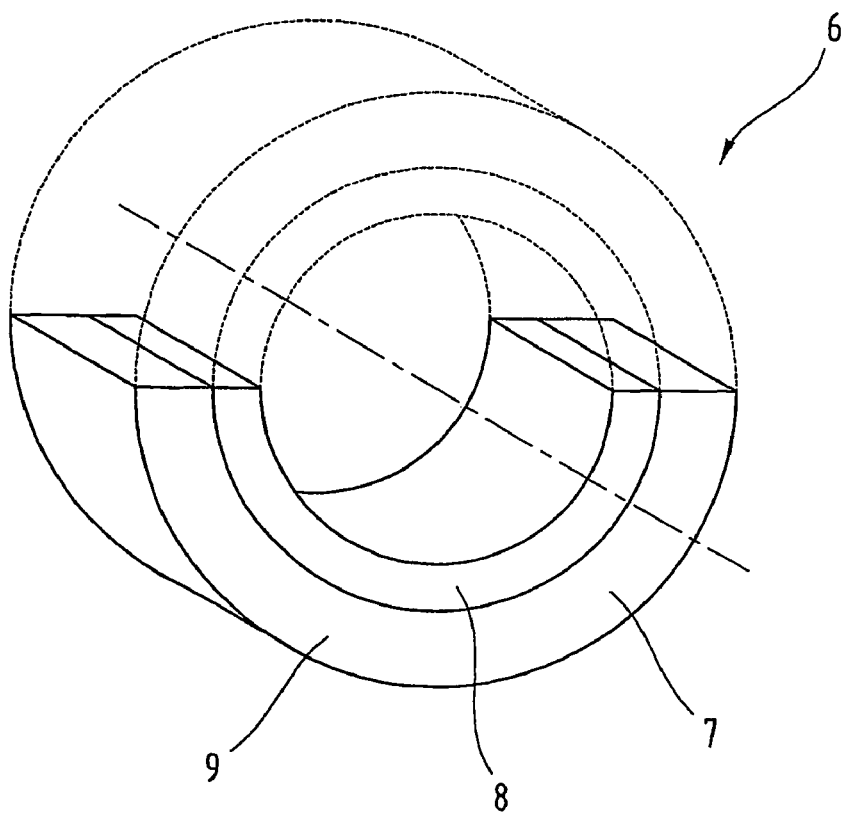
FIG. 2 shows an anti-friction coating proposed by the invention applied to a bearing element in the form of a bearing half-shell.

FIG. 2 illustrates an anti-friction coating proposed by the invention disposed in an anti-friction element 6 in the form of a bearing half-shell.

The alloy or anti-friction coating proposed by the invention may be produced by means of a cold gas spraying process at temperatures below the melting point of the element with the lowest melting point. However, the gas temperature may also be above this melting point because, due to the short dwell time of the particles in the gas jet, the particles are not fully melted. The high kinetic energy applied to the spray particles causes a dense structure or a dense structure can occur when the particles collide with a substrate 7 which may simultaneously serve as a supporting layer of the anti-friction element 6. To this end, however, the particles must exceed a velocity that is characteristic for the respective material.

To this end, a gas is accelerated to hypersonic speed in a Laval nozzle, for example. The coating material or the materials of the individual phases are injected into the gas jet as a powder in front of this nozzle and accelerated towards the substrate 7.

The basic structure of such a cold gas spraying system is known from the prior art and more details may be obtained by referring to patent specification EP 0 484 533 B1 or WO 01/00331 A2, for example.

The substrate 7 may be provided in the form of a steel layer, for example, which imparts high mechanical strength to the bearing. In principle, however, any other material, in particular steels or lightweight metal alloys, would possibly suffice to satisfy requirements in terms of mechanical and thermal strength.

It is of advantage that the substrate is subjected to only slight thermal stress due to the relatively low temperatures prevailing during cold gas spraying and it is therefore possible to use less temperature-resistant materials for the substrate 7, which would not be suitable if using other thermal spraying processes due to the high stress caused by operating temperatures. As a result, allowance may be made for individual requirements when producing an anti-friction bearing, for example in terms of strength or resistance to corrosion.

It is also possible to apply extra heat to the gas jet, which will increase the flow rate of the gas and hence also the particle velocity, thereby improving the properties of the coating in terms of its density, homogeneity or adhesion capacity in particular.

As illustrated in FIG. 2 in the form of a bearing half-shell, the alloy proposed by the invention may comprise a first peripheral coating 8 which may be sprayed onto a second peripheral coating 9 or onto the substrate. However, the substrate 7 or the second peripheral coating 9 does not have to be a half-shell and a full shell could be used as the substrate 7 or second peripheral coating by configuring or disposing the cold gas spraying system and the nozzles accordingly, in which case the first peripheral coating 8 can be sprayed on by an appropriate movement of the substrate 7 relative to the nozzle of the cold gas spraying system.

For the purpose of the invention, an additional coating (not illustrated in FIG. 2) may be provided between the first peripheral coating 8 and the second peripheral coating 9 in the form of a diffusion barrier or an adhesion coating, since this will improve the adhesion of the anti-friction coating, respectively the first peripheral coating 8, on the second peripheral coating 9 or prevent a diffusion of elements between the first and the second peripheral coating 8, 9, on the one hand. On the other hand, a multi-coat bearing can be produced with identical equipment, essentially without having to change parts.

Due to the fact that the particles do not melt in the gas jet, coatings with an extremely low oxide content can be produced and the oxygen content of the coating is no higher than that of the particles in the initial powder used to produce the coating.

It has proved to be of advantage if the equipment used for the cold gas spraying process is optimised so that, for example, a separate spraying system is used respectively for the matrix 2 and the soft phase 3 and/or the hard phase 5, which means that spraying parameters can be optimised to suit the respective material used, for example pressure, temperature or particle velocity.

This results in better adhesion of the particles to the substrate in particular, thereby enabling the coating quality to be improved. Other optimisation possibilities for adapting to individual applications are the spraying distance, the size of particles used, the process gas used and the nozzle geometry used.

The process gas may be nitrogen, argon, neon, xenon or helium or mixtures thereof.

FIG. 3 illustrates the change in hardness of the anti-friction coating in the areas subjected to stress during operation.

Due to the presence of the soft phase 3 or the hard phase 5 in the matrix 2 in its original composition and due to the fact that a bond forms only in the region of the phase boundary 4, the anti-friction coating or the anti-friction element 6 has particularly good properties with regard to adaptability, ability to embed foreign particles, good galling resistance properties and a high bearing capacity.

During operation with the anti-friction element 6, the temperature in areas of the anti-friction coating subjected to high loads is naturally higher than in areas subjected to less load. Since the coefficient of diffusion of the different elements depends in principle to a large degree on temperature, increased diffusion occurs in these areas so that the structure of the anti-friction coating approaches the state of equilibrium resulting in a structural change in the direction of the equilibrium phases.

Particularly in the region of the phase boundary 4, for example, a mixed crystal or an inter-metallic compound can form between the matrix 2 and the soft phase 3 and/or hard phase 5 due to the higher temperatures which occur there as a result of high mechanical stress. This leads to an increase in the hardness of the anti-friction coating in these highly stressed areas, making it more resistant.

The anti-friction coating or anti-friction element 6 advantageously adapts to the load state induced by the co-operating friction element and operating requirements.

The increase in hardness is plotted in the diagram of FIG. 3, where the operating time is plotted on the X-axis and the hardness of the stressed areas of the coating is plotted on the Y-axis. The curve of this increase in hardness may also have curvatures and need not necessarily be linear.

During operation, a sort of equilibrium state is reached after a period of time, after which no further increase in hardness to speak of is observed.

One possible variant of the alloy proposed by the invention will be described taking the example of producing a CuSn15 alloy.

The initial powders are spherical copper particles in a size range of approximately 5 to 25 µm and spherical tin particles in a size range of up to approximately 45 µm. The process gas is nitrogen. The gas temperature is 200° C. The initial powders are injected into the gas jet in front of the nozzle in the appropriate ratio and accelerated towards the substrate at a gas pressure of 25 bar from a spraying distance of 30 mm. Consequently, a dense and firmly adhering coating which is also low in oxides forms on the substrate and comprises a copper matrix with tin particles dispersed in it, thereby achieving good tribological properties.

The embodiments described are intended to illustrate possible examples of the alloy and the anti-friction element 6 and it should be pointed out at this stage that the invention is not restricted to the embodiments specifically described as examples here, and various combinations of the individual embodiments are also possible, in which case these possible embodiments are within the reach of the person skilled in this technical field using the teaching of the invention. Accordingly, all conceivable embodiments which can be obtained on the basis of a combination of individual details taken from the embodiments described fall within the scope of the invention.

Finally, for the sake of good order, it should be pointed out that, in order to provide a clearer understanding of the structure of the anti-friction coating and the anti-friction element 6, it and its constituent parts are illustrated to a certain extent out of scale and/or on an enlarged scale and/or on a reduced scale.

The individual objectives and associated solutions may be found in the description.

Above all, the individual embodiments of the subject matter illustrated in FIGS. 1; 2; 3 may be construed as independent solutions proposed by the invention in their own right. The underlying objectives and associated solutions may be found in the detailed descriptions of these drawings.

LIST OF REFERENCE NUMBERS

1 Structure
2 Matrix
3 Soft phase
4 Phase boundary
5 Hard phase
6 Anti-friction element
7 Substrate
8 Peripheral coating
9 Peripheral coating

The invention claimed is:

1. A bearing element comprising at least a first peripheral coating and a supporting layer disposed on top of said first peripheral coating, wherein the first peripheral coating is formed by an anti-friction coating produced by means of a cold gas spraying process made from an alloy, wherein the alloy comprises a matrix element and at least one phase element, said matrix element forming a matrix and said at least one phase element having a phase selected from the group consisting of a soft phase and a hard phase, wherein the at least one phase element forms a solid solution or a bond with the matrix element, wherein the at least one phase element is dispersed in the matrix and the solid solution or bond is formed only in the region of the phase boundary of the matrix with the at least one phase element so that the first peripheral coating is able to adapt and embed pieces abraded from parts to be supported.

2. The bearing element as claimed in claim 1, wherein the region of the phase boundary in which the solid solution or bond is formed has an average thickness in the range of between 0.1 µm and 3 µm.

3. The bearing element as claimed in claim 1, wherein the matrix element is selected from a group comprising aluminum, chromium, copper, magnesium, manganese, molybdenum, silicon, tin, titanium, tungsten and zinc, and the phase is a soft phase and the at least one phase element is different from the matrix element.

4. The bearing element as claimed in claim 3, wherein the proportion of matrix element is at least 55% by weight.

5. The bearing element as claimed in claim 1, wherein the phase is a soft phase and the at least one phase element is at least one element selected from an element group comprising silver, aluminum, gold, bismuth, calcium, copper, indium, magnesium, lead, tin, and zinc and the at least one phase element is different from the matrix element.

6. The bearing element as claimed in claim 5, wherein the phase is a soft phase and the proportion of soft phase is in the range of between 10% by weight and 45% by weight.

7. The bearing element as claimed in claim 1, wherein the phase is a lubricant and the at least one phase element is selected from a group comprising $MoS_2$, PTFE, silicone, barium sulphate and mixtures thereof.

8. The bearing element as claimed in claim 1, wherein the phase is a hard phase and the at least one phase element is at least one element selected from an element group comprising boron, diamond, cobalt, hafnium, iridium, molybdenum, niobium, osmium, rhenium, rhodium, ruthenium, silicon, tantalum, tungsten and zirconium, and the at least one phase element is different from the matrix element.

9. The bearing element as claimed in claim 8, wherein the phase is a hard phase and the proportion of hard phase is in the range of between 3% by weight and 25% by weight.

10. The bearing element as claimed in claim 1, wherein the phase is a hard phase and the at least one phase element is selected from the group consisting of $ZnS_2$, BN, $WS_2$, carbides, oxides, and mixtures thereof.

11. The bearing element as claimed in claim 1, wherein an additional coating is provided between the first peripheral coating and the supporting layer in the form of a diffusion barrier or adhesion layer.

* * * * *